United States Patent
Monstrey et al.

(10) Patent No.: US 10,675,656 B2
(45) Date of Patent: Jun. 9, 2020

(54) FLUIDIZED BED GRANULATION

(71) Applicant: GREEN GRANULATION LIMITED, Hong Kong (CN)

(72) Inventors: Ken Monstrey, Assenede (BE); Wei Wang, Chaoyang Beijing (CN)

(73) Assignee: Green Granulation Limited, Hong Kong (CN)

( * ) Notice: Subject to any disclaimer, the term of this patent is extended or adjusted under 35 U.S.C. 154(b) by 370 days.

(21) Appl. No.: 15/614,158

(22) Filed: Jun. 5, 2017

(65) Prior Publication Data
US 2017/0354989 A1 Dec. 14, 2017

(30) Foreign Application Priority Data
Jun. 8, 2016 (NL) .................................... 2016915

(51) Int. Cl.
| | | |
|---|---|---|
| *B01D 1/24* | (2006.01) | |
| *B01J 2/16* | (2006.01) | |
| *B05C 19/02* | (2006.01) | |
| *C05C 9/00* | (2006.01) | |
| *C05C 1/02* | (2006.01) | |
| *B05D 1/24* | (2006.01) | |

(52) U.S. Cl.
CPC ................ *B05C 19/02* (2013.01); *B01D 1/24* (2013.01); *B01J 2/16* (2013.01); *B05D 1/24* (2013.01); *C05C 1/02* (2013.01); *C05C 9/005* (2013.01)

(58) Field of Classification Search
CPC ... B01J 2/16; B01D 1/24; B05C 19/02; B05D 1/24; C05C 1/02; C05C 9/005
See application file for complete search history.

(56) References Cited

U.S. PATENT DOCUMENTS

| | | | | |
|---|---|---|---|---|
| 6,137,001 A | * | 10/2000 | Broeker | C01B 7/093 562/413 |
| 8,974,763 B1 | * | 3/2015 | Jain | C05C 3/005 422/129 |
| 9,540,288 B2 | * | 1/2017 | Jain | C05C 3/005 |
| 2004/0088830 A1 | * | 5/2004 | Mennen | B01J 2/16 23/293 A |
| 2011/0229394 A1 | * | 9/2011 | Niehues | C05C 3/005 423/238 |
| 2015/0217221 A1 | * | 8/2015 | Wang | B01D 47/06 95/199 |
| 2015/0217248 A1 | | 8/2015 | Wang | |
| 2016/0115089 A1 | * | 4/2016 | Wang | C05C 1/02 264/12 |

FOREIGN PATENT DOCUMENTS

| | | |
|---|---|---|
| CN | 202951449 U | 5/2013 |
| EP | 2192099 A1 | 6/2010 |
| FR | 1341589 A | 11/1963 |
| WO | 02057005 A1 | 7/2002 |

OTHER PUBLICATIONS

Search Report and Written Opinion for Dutch patent application No. NL2016915, dated Apr. 21, 2017.

* cited by examiner

*Primary Examiner* — Jonathan Miller
(74) *Attorney, Agent, or Firm* — Steven M. Koehler; Westman, Champlin & Koehler, P.A.

(57) ABSTRACT

A fluidized bed reactor includes at least one granulation compartment with one or more air inlets, and at least one scrubber for cleaning air from the granulator, such as a wet scrubber and/or a dry scrubber. The reactor comprises a return line for recycling cleaned air leaving the scrubber to the air inlets of the granulation compartment.

12 Claims, 2 Drawing Sheets

FLUIDIZED BED GRANULATION

BACKGROUND

The discussion below is merely provided for general background information and is not intended to be used as an aid in determining the scope of the claimed subject matter.

Aspects of the invention relate to a fluidized bed reactor and a method for the production of granules, such as granules of urea or ammonium nitrate, typically used as a fertilizer material.

TECHNOLOGICAL BACKGROUND

To produce urea granules a urea liquid, such as an aqueous or non-aqueous urea solution, is sprayed into a granulation compartment containing a fluidized bed of solid nuclei. The fluidized bed is fluidized by blowing a fluidization gas, usually air, through the bed of nuclei. The nuclei grow by solidification and crystallization of the sprayed urea liquid on them, to form granules of a desired average size. US 2015/217248 and US 2015/217221 disclose examples of such a fluidized bed reactor for the production of urea granules.

Used fluidization air contains an amount of dust and is first stripped, e.g., by means of a wet scrubber or a dry scrubber, such as bag filters, before it is vented.

Freshly produced granules are generally moved from the granulation compartment(s) to an after-cooler. In the after-cooler further dust is produced. Dust originating from the after-cooler has relatively few but large particles. This coarse dust is easily removed in a conventional wet or dry scrubber before the used air can be vented.

Most of the dust is produced in the granulation compartment(s). Dust in used fluidization air coming from a granulation compartment comprises urea dust particles originating from the spray system or from friction between, on the one hand, the granules and dust from the crushing of oversized product which is recycled to the granulator, and on the other hand stripped gases evaporated from the urea solution feed. In addition to that dust there is an amount of ammonia carbonate, ammonia bicarbonate, ammonia cyanate and $NH_3$ isocyanate ($NH_4OCN$), which is an isomer of urea and can be converted into urea or be hydrolysed into $NH_3$ and $CO_2$. Both the ammonia (bi)carbonate and the $NH_4OCN$ are dissolved in the concentrated urea solution when it enters the granulation compartment. Both products are salts of a weak and volatile base (ammonia) with a very weak but volatile acid ($CO_2$) or the less weak but also volatile cyanic or isocyanic acid (HOCN). Upon contact with air in the granulation compartment $NH_3$, $CO_2$ and HOCN will evaporate and be borne by discharged air.

The concentrated urea solution feed typically contains about 500 ppm of free $NH_3$ (in combination with $CO_2$) and 5000 ppm of $NH_4OCN$. Free $NH_3$ is easy to separate with a wet scrubber by injecting a strong acid into the scrubber solution. Any strong acid can be used. The by-product of the acidulous wash is an ammonia salt. This ammonia salt has only a few practical applications and has a low economic value.

$NH_4OCN$ cannot be separated in an acid washing stage, but is evaporated from the hot urea solution as $NH_3$ gas and HOCN gas. $NH_3$ and HOCN are stripped by air. Upon cooling, e.g., in the wet scrubber and/or in other scrubber types, these gases recombine to extremely fine $NH_4OCN$ particles. Only a small amount will be caught in a wet scrubber. This can be boosted by improving the contact between the airstream and the washing liquid in a wet scrubber at the cost of high energy consumption and a high pressure drop.

The very fine $NH_4OCN$ particles are not separated by ammonia sampling or by dust sampling because the particles are too fine. The $NH_4OCN$ will be vented to the atmosphere. This also means a direct loss of production for the urea producer.

Apart from any influence on the environment, the huge airflow through the granulation compartment with a wet air scrubber also consumes a lot of water, which is vented into the atmosphere. This includes water originating from the concentrated urea melt concentration feed evaporated in the granulator. There is also a substantial amount of scrubbing liquid (a solution mostly based on water) used in the wet scrubbers. Although scrubbers are usually designed in such a way that water droplets are caught prior to the stack inlet, air leaving the scrubber still is maximally saturated. All water content in this air is vented into the atmosphere.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A fluidized bed reactor includes at least one granulation compartment with one or more air inlets, and at least one scrubber for cleaning air from the granulator, such as a wet scrubber and/or a dry scrubber. The reactor comprises a return line for recycling cleaned air leaving the scrubber to the air inlets of the granulation compartment. No dust particles are vented to the environment and the net consumption of total fluidization air is substantially reduced.

In a specific embodiment the return line comprises one or more compressors, one or more coolers downstream the compressor(s) and one or more expanders downstream the cooler(s), consecutively in flow direction of the recycled air flow. Air leaving the wet scrubber is saturated with water. This air is compressed in the compressor. This results in a significant rise of temperature of the humid air. This will cause the ammonium cyanate ($NH_4OCN$) to split into ammonia and isocyanic acid. The latter will partly be hydrolyzed into ammonia and carbon dioxide. Another part of the ammonium cyanate will be converted into urea. The compressed air is subsequently cooled in the cooler to a temperature below the condensation temperature. The condensed water will at least partly absorb ammonia, carbon dioxide, urea and remaining isocyanic acid. The condensed water with its absorbed contents is separated from the air flow. Heat recovered from the compressed air can be used to reduce energy consumption of the system. The compressed and cooled air is subsequently fed to the expander. In the expander the pressure is reduced. This results in a sharp drop of the air temperature. The largest part of the compression energy is recovered. Due to the temperature drop a further part of the water content will condense and absorb pollutants.

Optionally, the reactor may comprise or may be connected to a water treatment unit for treating separated condensed water to at least partly separate ammonia, carbon dioxide, isocyanate acid and/or urea.

The sharp temperature rise in the compressor, followed by the sharp temperature drop in the expander dries the air. When the air is recycled from the expander to the granulation compartment the air can be completely dry. All the water in the system can be recuperated. The water consumption by the granulation compartment is significantly reduced, e.g., to a negligible level. In places where water supply is limited the granulator can be converted into a water producer rather than a water consumer.

The substantially clean and dry air can be recycled to the granulation compartment, e.g., in a closed loop or optionally mixed with fresh air and/or another suitable gas. The recycled air can be used as fluidization air and/or as air feeding the sprayers. Optionally, air recycled to the sprayers can be recycled directly from the compressor.

The reactor may for example comprise means for reheating air recycled to the granulation compartment, such as a heat exchanger with flow channels for recycled air thermoconductively connected to flow channels between the compressor and the cooler. In such an air-to-air heat exchanger air flowing to the cooler is cooled down, while air recycling to the granulation compartment is (slightly) reheated.

The fluidized bed may comprise one or more coolers, e.g., one or more fluidized bed after-coolers and/or one or more bulk flow coolers. Stepwise cooling with an intermediate cooler followed by a final cooler is also possible. Such an after cooler may also comprise an air return line for recycling air leaving the after-cooler to the air inlets of the granulation compartment and/or air inlets of the after cooler.

In a specific embodiment the air return line coming from the after-cooler may join the return line from the wet scrubber, e.g., upstream the compressor.

The reactor is particularly useful for a method for the production of granules using a fluidized bed reactor comprising at least one granulation compartment with one or more air inlets, and at least one wet scrubber for cleaning air from the granulator, wherein air leaving the wet scrubber is at least partly recycled to air inlets of the granulation compartment.

BRIEF DESCRIPTION OF THE DRAWING

Aspects of the invention will be elucidated with reference to the accompanying drawing.

DETAILED DESCRIPTION OF ILLUSTRATIVE EMBODIMENTS

Figure 1:
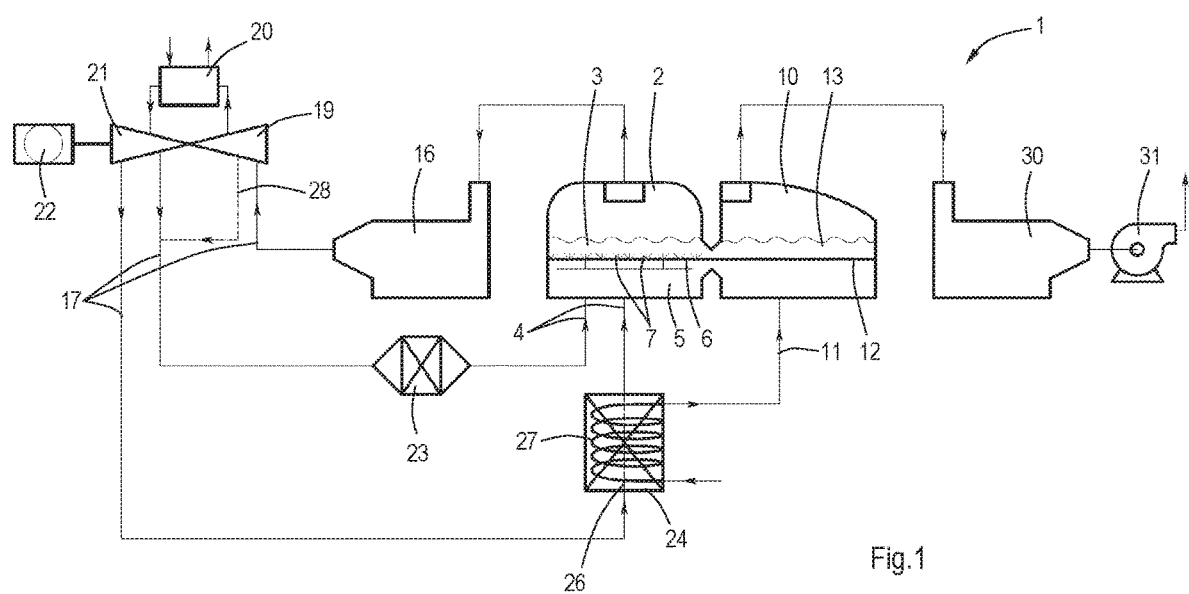
FIG. 1: shows schematically an exemplary embodiment of a fluidized bed reactor.

FIG. 1 shows a fluidized bed reactor 1 comprising a granulation compartment 2 holding a bed 3 of solid nuclei. The granulation compartment 2 is provided with inlets 4 for fluidization air in an air chamber 5 below a grid floor 6 carrying the bed 3. Sprayers 7 on the grid floor 6 are used for spraying urea liquid into the bed 3. The sprayed urea liquid crystallizes on the nuclei to form granules.

Downstream the granulation compartment 2 the fluidized bed reactor 1 comprises an after-cooler 10. During the granulation process granules are gradually moved from the granulation compartment 2 to the after-cooler 10. In the after-cooler 10 cool fluidization air is blown via air inlets 11 below a grid 12 floor carrying a bed 13 of the granules. The after-cooler 10 may for example include one or more fluidized bed after-coolers and/or one or more bulk flow coolers. Stepwise cooling with one or more intermediate coolers followed by a final cooler is also possible.

Used fluidization air is discharged from the granulation compartment 2 and led to a wet scrubber 16. The fluidization air contains dust and other pollutants, which are to be removed in the wet scrubber.

A return line 17 recycles air leaving the wet scrubber 16 to the air inlets 4 of the granulation compartment 2. When the air leaves the wet scrubber 16, the air is saturated with water. In flow direction the return line 17 successively comprises a compressor 19, a cooler 20 and an expander 21, driven by a motor 22. The recycled air is first compressed in the compressor 19, then cooled in the cooler 20 and finally decompressed in the expander 21 before it re-enters the granulation compartment 2. During this process the air is dried and condensed water absorbs most of the pollutant content.

In the cooler 20 and the expander 21 the air is significantly cooled. Therefore, the air is first re-heated before it is recycled to the air inlets 4 of the granulation compartment 2. Part of the air is re-heated in an air heater 23 in the return line 17 downstream the expander 21. Optionally, reheating can be limited or even excluded by using uncleaned air from the compressor, which is still warm. Another part of the air is re-heated in an air-to-air heat exchanger 24 with flow channels 26 for recycled air being thermo-conductively connected to air flow channels 27 leading to the after-cooler 10.

It is also possible to transport part of the air, or all of the air, from the compressor directly to the heater 23. This is indicated in FIG. 1 by the dashed line 28. Since this air is not cooled, the energy consumption of the air heater 23 will be lower.

Also air leaving the after-cooler 10 is loaded with dust and must be treated in a wet scrubber 30 or any other suitable air cleaning device before the air is withdrawn by a fan 31 and vented to the atmosphere. This air does not contain ammonia or ammonium cyanate.

Figure 2:
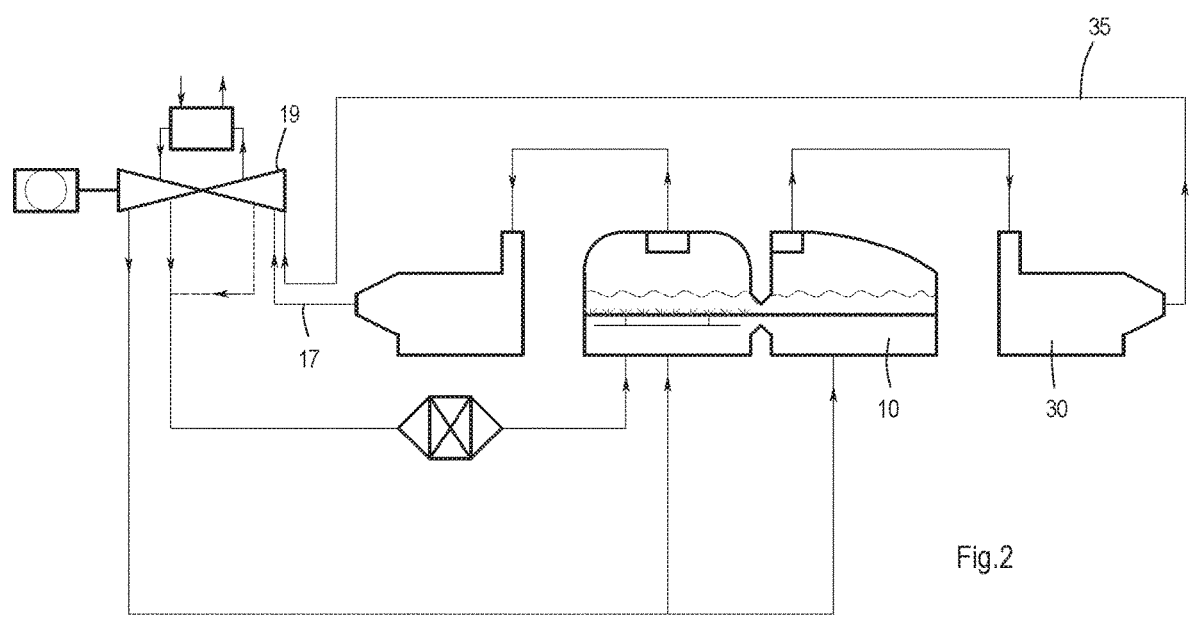
FIG. 2: shows schematically a second exemplary embodiment of a fluidized bed reactor.

FIG. 2 shows an alternative embodiment similar to the embodiment of FIG. 1 but with a return line 35 recycling cleaned air from the wet scrubber 30 of the after-cooler 10 to the compressor 19. Air from the wet scrubber 30 of the after-cooler 10 is mixed with the recycled cleaned air coming from the wet scrubber 16 of the granulation compartment 2 and the two joint gas flows are jointly treated and recycled.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A fluidized bed reactor comprising:
   at least one granulation compartment with one or more air inlets;
   at least one scrubber coupled to the granulation compartment configured to receive and clean air from the granulation compartment; and
   a return line from an outlet of the air scrubber to the one or more air inlets, and wherein the return line comprises a compressor, a cooler and an expander coupled consecutively in a flow direction of the recycled air flow.

2. The fluidized bed reactor according to claim 1 comprising reheating means for reheating air recycled to the granulation compartment.

3. The fluidized bed reactor according to claim 1 and further comprising a fluidized bed after-cooler and/or a bulk flow cooler coupled to the granulation compartment to receive granules from the granulation compartment.

4. The fluidized bed reactor according to claim 2, and further comprising a fluidized bed after-cooler and/or a bulk flow cooler coupled to the granulation compartment to receive granules from the granulation compartment, wherein the reheating means include a heat exchanger with one or more flow channels for recycled air thermo-conductively contacting air flow leading to the after-cooler.

5. The fluidized bed reactor according to claim 3 and further comprising an air return line configured to recycle air leaving the after-cooler to the air inlets of the granulation compartment.

6. The fluidized bed reactor according to claim 3, comprising an air return line configured to recycle air leaving the after-cooler to air inlets of the after cooler.

7. The fluidized bed reactor according to claim 3 and further comprising an air return line coupling air from the after-cooler to the compressor.

8. A method for the production of granules using a fluidized bed reactor comprising:
    injecting air into at least one granulation compartment with one or more air inlets;
    cleaning air from the granulation compartment with at least one scrubber, and wherein air leaving the scrubber is at least partly recycling air from the scrubber to the one or more air inlets of the granulation compartment utilizing a return line;
    compressing at least a part of the air leaving the scrubber;
    cooling, at least a part of the compressed air with a cooler; and
    decompressing at least a part of the cooled compressed air with an expander before the air is recycled back to the one or more air inlets.

9. The method according to claim 8, wherein decompressing includes separating $NH_3$, $CO_2$ and $NH_4OCN$ from condensate recovered with the decompressing.

10. The method according to claim 8 and further comprising recycling part of the compressed air to sprayers as atomization air.

11. The method according to claim 8 and further comprising recycling part of the compressed air to sprayers as atomization air.

12. The method according to claim 9 and further comprising recycling part of the compressed air to sprayers as atomization air.

\* \* \* \* \*